United States Patent
Matuszyk et al.

(10) Patent No.: US 10,557,959 B2
(45) Date of Patent: Feb. 11, 2020

(54) EVALUATION OF PHYSICAL PROPERTIES OF A MATERIAL BEHIND A CASING UTILIZING GUIDED ACOUSTIC WAVES

(71) Applicants: Pawel Jerzy Matuszyk, Spring, TX (US); Douglas J. Patterson, Magnolia, TX (US)

(72) Inventors: Pawel Jerzy Matuszyk, Spring, TX (US); Douglas J. Patterson, Magnolia, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/374,579

(22) Filed: Dec. 9, 2016

(65) Prior Publication Data

US 2018/0164462 A1    Jun. 14, 2018

(51) Int. Cl.
   *G01V 1/50* (2006.01)
   *E21B 47/00* (2012.01)

(52) U.S. Cl.
   CPC ............ *G01V 1/50* (2013.01); *E21B 47/0005* (2013.01)

(58) Field of Classification Search
   CPC .............................. G01V 1/50; E21B 47/0005
   USPC .............................................. 367/35; 181/105
   See application file for complete search history.

(56) References Cited

U.S. PATENT DOCUMENTS

| | | | |
|---|---|---|---|
| 4,633,449 A | 12/1986 | Ingram et al. | |
| 5,189,914 A * | 3/1993 | White | G01H 13/00 73/19.03 |
| 6,575,043 B1 | 6/2003 | Huang et al. | |
| 6,848,295 B2 * | 2/2005 | Auner | B82Y 10/00 257/E21.109 |
| 6,920,082 B2 | 7/2005 | Tang | |
| 7,663,969 B2 | 2/2010 | Tang et al. | |
| 7,773,454 B2 | 8/2010 | Barolak et al. | |
| 8,408,064 B2 | 4/2013 | Hartog et al. | |
| 8,490,693 B2 | 7/2013 | Birchwood et al. | |
| 9,273,545 B2 | 3/2016 | Bolshakov et al. | |
| 9,389,330 B2 | 7/2016 | Khajeh et al. | |
| 2006/0233048 A1 * | 10/2006 | Froelich | E21B 47/0005 367/35 |

(Continued)

OTHER PUBLICATIONS

Redpath, B.B. "Downhole Measurements of Shear- and Compression-Wave Velocities in Boreholes C4993, C4996, C4997 and C4998 at the Waste Treatment Plant DOE Hanford Site", Pacific Northwest National Laboratory, Apr. 2007; 76 pages.

(Continued)

*Primary Examiner* — Ian J Lobo
(74) *Attorney, Agent, or Firm* — Cantor Colburn LLP

(57) ABSTRACT

Systems and methods for determining physical properties of a material in contact with an external surface of a casing disposed in a borehole including inducing, with a transducer, a first shear horizontal (SH) wave in the casing at a first SH order, measuring, with a sensor disposed on the casing, an attenuation of the first SH wave to generate a first measurement, inducing a second SH wave in the casing at a second SH order that is different from the first SH order, measuring an attenuation of the second SH wave to generate a second measurement, and extracting a physical properties of the material in contact with the external surface of the casing from the first and second measurements.

20 Claims, 8 Drawing Sheets

(56) References Cited

U.S. PATENT DOCUMENTS

| | | | |
|---|---|---|---|
| 2007/0206439 A1* | 9/2007 | Barolak | E21B 47/0005 367/35 |
| 2007/0211572 A1* | 9/2007 | Reiderman | B06B 1/04 367/35 |
| 2009/0164129 A1 | 6/2009 | Sayers | |
| 2011/0280102 A1 | 11/2011 | Wang et al. | |
| 2012/0075953 A1* | 3/2012 | Chace | E21B 47/0005 367/35 |
| 2013/0021874 A1 | 1/2013 | Hartog et al. | |
| 2014/0177389 A1 | 6/2014 | Bolshakov et al. | |
| 2015/0109886 A1 | 4/2015 | Mekic et al. | |
| 2016/0003779 A1* | 1/2016 | Seung | G01N 29/2412 73/643 |
| 2016/0069181 A1 | 3/2016 | Kuijik et al. | |
| 2016/0070014 A1 | 3/2016 | Khajeh et al. | |

OTHER PUBLICATIONS

International Search Report, International Application No. PCT/US2017/065225, dated Mar. 22, 2018, Korean Intellectual Property Office; International Search Report 3 pages.

International Written Opinion, International Application No. PCT/US2017/065225, dated Mar. 22, 2018, Korean Intellectual Property Office; International Written Opinion 10 pages.

* cited by examiner

EVALUATION OF PHYSICAL PROPERTIES OF A MATERIAL BEHIND A CASING UTILIZING GUIDED ACOUSTIC WAVES

BACKGROUND

1. Field of the Invention

The present invention generally relates to exploration and measurements made downhole in a borehole.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

In more detail, wellbores or boreholes for producing hydrocarbons (such as oil and gas) are drilled using a drill string that includes a tubing made up of, for example, jointed tubulars or continuous coiled tubing that has a drilling assembly, also referred to as the bottom hole assembly (BHA), attached to its bottom end. The BHA typically includes a number of sensors, formation evaluation tools, and directional drilling tools. A drill bit attached to the BHA is rotated with a drilling motor in the BHA and/or by rotating the drill string to drill the wellbore. While drilling, the sensors can determine several attributes about the motion and orientation of the BHA that can used, for example, to determine how the drill string will progress. Further, such information can be used to detect or prevent operation of the drill string in conditions that are less than favorable.

In the process of extracting hydrocarbons, e.g., petroleum, from beneath the surface of the earth, wells are drilled and steel pipe (casing) is placed into the drilled hole (wellbore or borehole). Cement is then pumped into the annular space between the casing and the rock wall of the borehole (formation). The cement serves two major purposes. First, it transfers stress from the casing to the formation, increasing the effective strength and working pressure of the casing. Second, it serves to isolate vertically adjacent zones within the formation, preventing migration of liquids and gases up the wellbore between the formation and the casing, from one zone to the next. Accordingly, it is important to assure the quality of the cement both during completion of the well and during its producing life. Acoustic cement evaluation devices (e.g., cement bond logs ("CBL")) conveyed by a cable (wireline) to move the tools up and down in the borehole have been the primary device to provide this assurance. The principle of evaluation is based on the loss of energy over time or distance of an acoustic wave excited in the casing. One area of conventional focus has been on determining whether cement is present outside the casing, e.g., to determine whether only fluid is present between the casing and the formation (free pipe), whether the space between the casing and the formation is filled with cement bonded to the casing (fully cemented pipe), or whether a small gap, filled with fluid, exists between the cement and casing (micro-annulus). However, conventional techniques are unable to adequately evaluate properties of the cement.

SUMMARY

Disclosed herein are systems and methods for determining physical properties of a material in contact with an external surface of a casing disposed in a borehole. The systems and methods include inducing, with a transducer, a first shear horizontal (SH) wave in the casing at a first SH order, measuring, with a sensor disposed on the casing, an attenuation of the first SH wave to generate a first measurement, inducing a second SH wave in the casing at a second SH order that is different from the first SH order, measuring an attenuation of the second SH wave to generate a second measurement, and extracting physical properties of the material in contact with the external surface of the casing from the first and second measurements.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Disclosed are methods and systems for determining one or more physical properties of a material that is in contact with an external surface of a casing disposed in a borehole. The methods include inducing, with a transducer, a first shear horizontal (SH) wave in the casing at a first SH order and inducing a second SH wave in the casing at a second SH order that is different from the first SH order. Further, the methods include measuring, with a sensor disposed on the casing, an attenuation of the first SH wave to generate a first measurement and measuring an attenuation of the second SH wave to generate a second measurement. Employing the measurements, the methods include extracting physical properties of the material in contact with the external surface of the casing from the first and second measurements. Physical properties as used herein, includes, but is not limited to, density, shear velocity, compressional velocity, shear modulus, compressional modulus, Poisson's ratio, and Young's Modulus.

Figure 1:
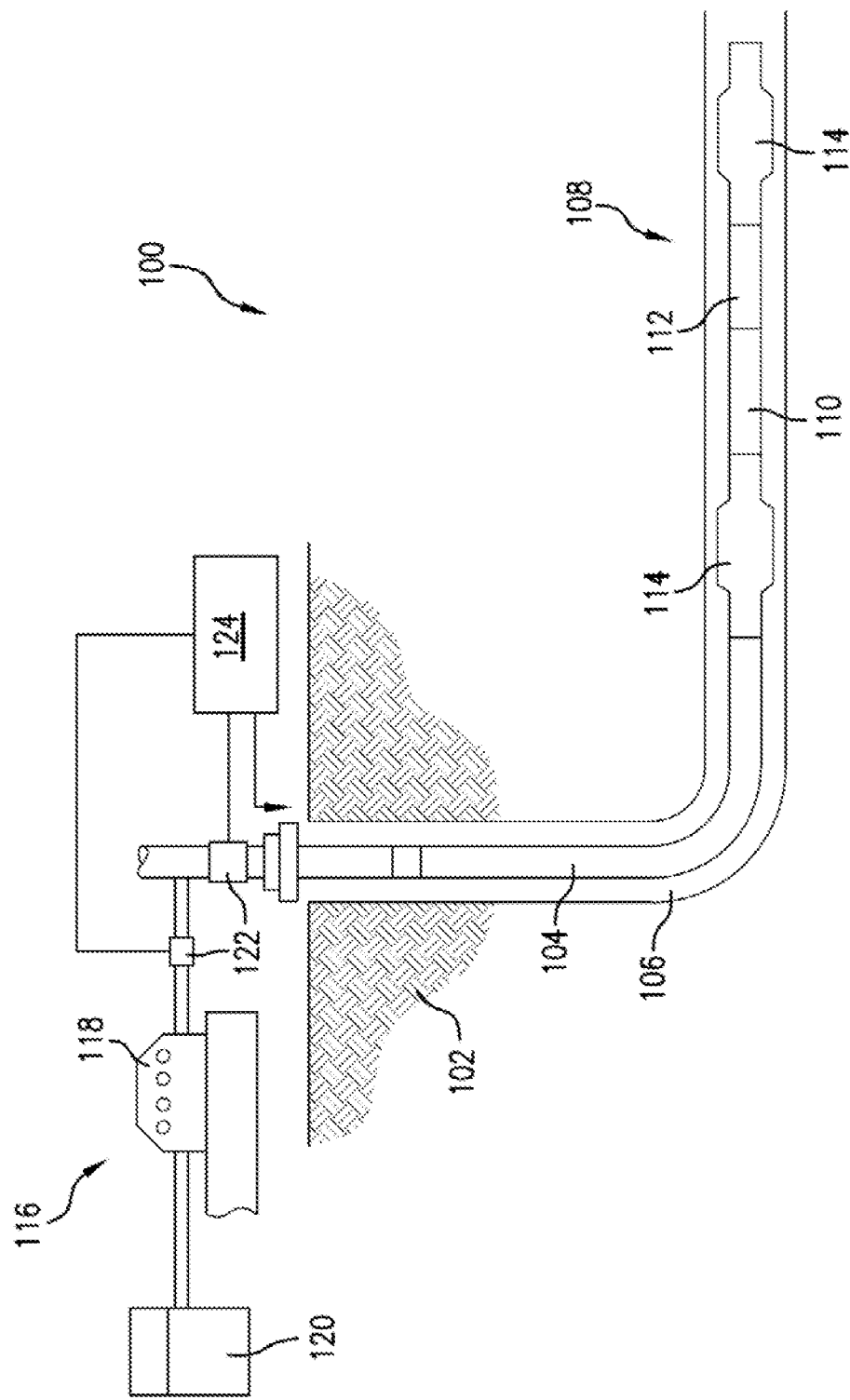
FIG. 1 depicts a system for formation stimulation and hydrocarbon production that can incorporate embodiments of the present disclosure.

Turning now to FIG. 1, a schematic illustration of an embodiment of a system 100 for hydrocarbon production and/or evaluation of an earth formation 102 that can employ embodiments of the present disclosure is shown. The system 100 includes a borehole string 104 disposed within a borehole 106. The string 104, in one embodiment, includes a plurality of string segments or, in other embodiments, is a continuous conduit such as a coiled tube. As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media, and/or member that may be used to convey, house, support, or otherwise facilitate the use of another device, device component, combination of devices, media, and/or member. Example, non-limiting carriers include, but are not limited to, casing pipes, wirelines, wireline sondes, slickline sondes, drop shots, downhole subs, bottomhole assemblies, and drill strings.

In one embodiment, the system 100 is configured as a hydraulic stimulation system. As described herein, "stimulation" may include any injection of a fluid into a formation. A fluid may be any flowable substance such as a liquid or a gas, or a flowable solid such as sand. In such embodiment, the string 104 includes a downhole assembly 108 that includes one or more tools or components to facilitate stimulation of the formation 102. For example, the string 104 includes a fluid assembly 110, such as a fracture or "frac" sleeve device or an electrical submersible pumping system, and a perforation assembly 112. Examples of the perforation assembly 112 include shaped charges, torches, projectiles, and other devices for perforating a borehole wall and/or casing. The string 104 may also include additional components, such as one or more isolation or packer subs 114.

One or more of the downhole assembly 108, the fracturing assembly 110, the perforation assembly 112, and/or the packer subs 114 may include suitable electronics or processors configured to communicate with a surface processing unit and/or control the respective tool or assembly.

A surface system 116 can be provided to extract material (e.g., fluids) from the formation 102 or to inject fluids through the string 104 into the formation 102 for the purpose of fracing.

As shown, the surface system 116 includes a pumping device 118 in fluid communication with a tank 120. In some embodiments, the pumping device 118 can be used to extract fluid, such as hydrocarbons, from the formation 102, and store the extracted fluid in the tank 120. In other embodiments, the pumping device 118 can be configured to inject fluid from the tank 120 into the string 104 to introduce fluid into the formation 102, for example, to stimulate and/or fracture the formation 102.

One or more flow rate and/or pressure sensors 122, as shown, are disposed in fluid communication with the pumping device 118 and the string 104 for measurement of fluid characteristics. The sensors 122 may be positioned at any suitable location, such as proximate to (e.g., at the discharge output) or within the pumping device 118, at or near a wellhead, or at any other location along the string 104 and/or within the borehole 106.

A processing and/or control unit 124 is disposed in operable communication with the sensors 122, the pumping device 118, and/or components of the downhole assembly 108. The processing and/or control unit 124 is configured to, for example, receive, store, and/or transmit data generated from the sensors 122 and/or the pump 118, and includes processing components configured to analyze data from the pump 118 and the sensors 122, provide alerts to the pump 118 or other control unit and/or control operational parameters, and/or communicate with and/or control components of the downhole assembly 108. The processing and/or control unit 124 includes any number of suitable components, such as processors, memory, communication devices and power sources.

Figure 2:
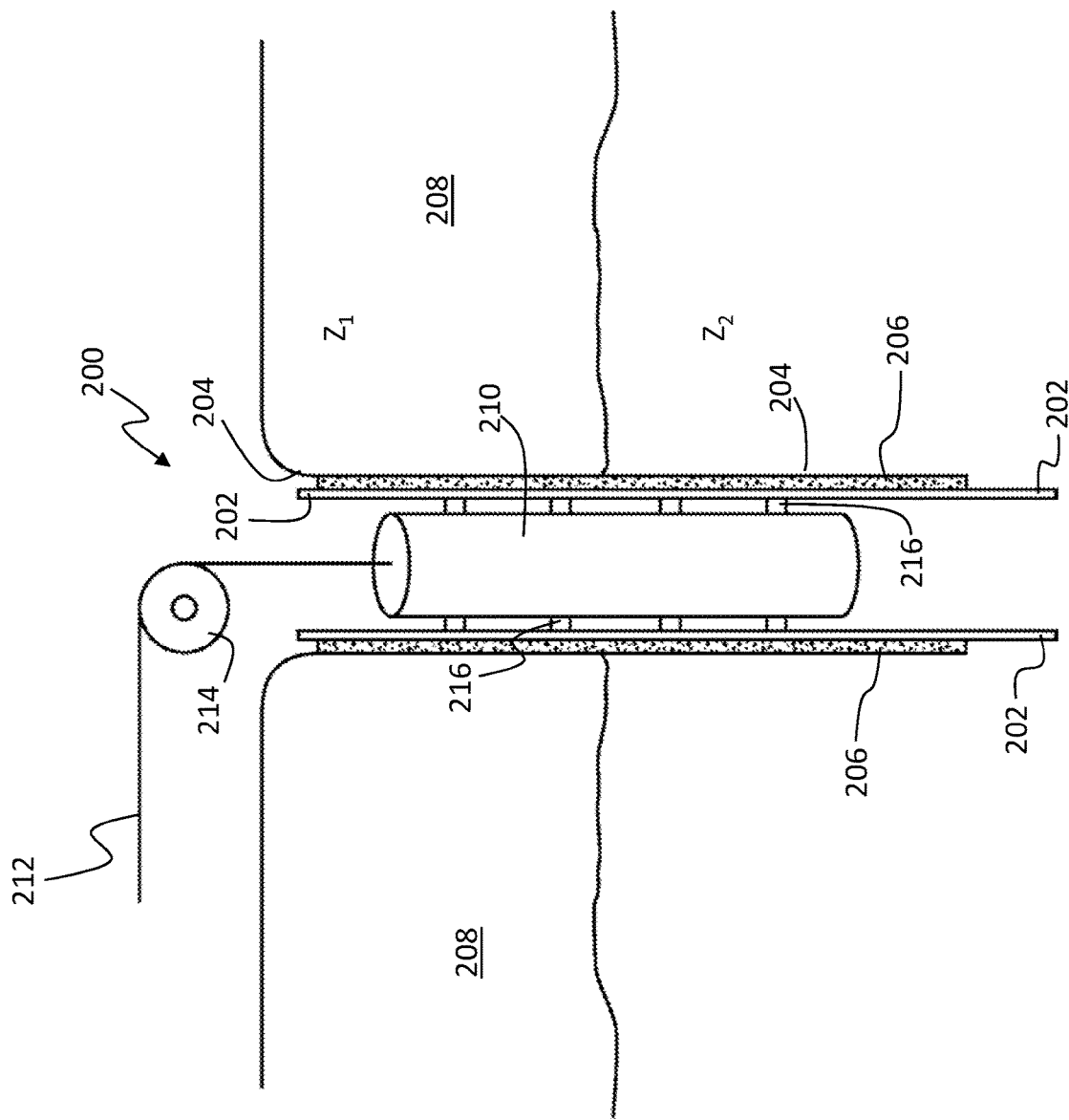
FIG. 2 illustrates a partial cutaway side view of a wellbore including a downhole logging tool disposed therein, in accordance with some embodiments.

FIG. 2 illustrates a partial cutaway side view of a wellbore including a downhole logging tool disposed therein, in accordance with various embodiments of the present disclosure. As illustrated in FIG. 2, a downhole testing and logging system 200 is shown. The system 200 includes a wellbores having casing 202 set within a wellbore 204, where the casing 202 is bonded to the wellbore 204 by the introduction of bonding material 206 within an annulus formed between an outer diameter of the casing 202 and an inner diameter of the wellbore 204. The bonding material 206 may be cement, resin based epoxy, or other material or compound used to provide a bond between the casing 202 and the wellbore 204. The bonding provided by the bonding material 206 not only adheres to the casing 202 within the wellbore 204, but also serves to isolate adjacent zones (e.g., $Z_1$, $Z_2$, etc.) within an earth formation 208. Isolating adjacent zones $Z_1$, $Z_2$ can be important, for example, when one of the zones $Z_1$, $Z_2$ contains oil or gas and the other zone $Z_1$, $Z_2$ includes a non-hydrocarbon fluid such as water. Should the bonding material 206 surrounding the casing 202 be defective and fail to provide isolation of the adjacent zones $Z_1$, $Z_2$, water or other undesirable fluid can migrate into the hydrocarbon producing zone $Z_1$, $Z_2$ thus diluting or contaminating the hydrocarbons within the producing zone $Z_1$, $Z_2$, and can thus increase production costs, delay production, an/or inhibit resource recovery. Alternatively, it may be advantageous to determine various properties of the bonding material, any earth formation 208 in contact with the casing, or other downhole property for various reasons.

As shown, downhole tools 210 can be used for analyzing and calculating various physical properties of the bonding material 206. These downhole tools 210 are lowered into the wellbore 204 by a wireline 212 in combination with a pulley 214 and (in some cases where the wellbore 204 is located on land rather than on the seafloor) a surface truck (not shown). Downhole tools 210 typically include transducers 216 disposed on an outer surface of the downhole tools 210 such that the transducers 216 can interact with the casing 202, the bonding material 206, and/or the earth formation 208 that is in contact with the casing 202. In some configurations and embodiments, the transducers 216 are capable of emitting acoustic waves into the casing 202 and recording an amplitude of the acoustic waves as the acoustic waves travel or propagate across the casing 202. Characteristics of the bonding material 206 or other material in contact with an exterior surface of the casing 202 can be determined by analyzing characteristics of the acoustic wave, such as attenuation. Transducers 216 can be formed to be acoustically coupled to a fluid in the borehole, although alternative types of transducers, including but not limited to, electromagnetic transducers that do not require acoustic coupling to a fluid may be employed in embodiments of the present disclosure. Those of skill in the art will appreciate that any types and/or installations of transducers can be employed without departing from the scope of the present disclosure. For example, in some non-limiting configurations, an installed and/or permanent transducer can be used to perform processes as described herein. In other non-limiting embodiments, the transducers can be mechanically coupled to a tool, such as wedge transducers. Thus, the above descriptions and associated illustrations are not intended to be limiting, but rather are provided for illustrative and explanatory purposes.

One use of the transducers 216 to measure properties of the bonding material 206 may be referred to as acoustic cement bond log (CBL) technologies. Currently existing acoustic CBL technologies produce cement maps based on measured attenuations or measured signal decay, such as in pulse-echo measurements. Such measurements rely heavily on cement acoustic impedance (a product of cement density and cement compressional velocity) and do not directly measure anything that depends on cement shear velocity alone. Consequently, one may be able to obtain only an estimation of cement compressional velocity from those measurements, while cement shear properties remain uncharacterized. The bonding material density is traditionally known a priori and based on manufacturing specifications, laboratory measurements, and/or surface measurements prior to injection into a borehole. That is, the density of the cement behind the casing is estimated a priori, and an attenuation measurement of one clean shear horizontal ("SH") mode can deliver reasonably reliable information about a shear wave velocity of the bonding material 206. That is, in traditional systems and methods, the density of the bonding material 206 is assumed or determined at the surface and then applied within calculations that incorporate downhole measurements.

However, the in situ density of the bonding material is not actually known. That is, the density of the bonding material must be assumed based on information obtained prior to injection into a borehole. Such injection and subsequent pumping into the borehole (e.g., through a string and/or into an annulus) can introduce impurities, dirt, fluids (e.g., liquids, gases), and/or other materials and contaminants such that the bonding material that is present surrounding the casing may not have the same density as the bonding material at the time of injection at the surface.

Embodiments described herein are directed to systems and methods for obtaining in situ density measurements of bonding material that is in contact with a casing that has been disposed downhole. Further, in accordance with some embodiments of the present disclosure, a density of any material that is in contact with an exterior of a casing may be obtained. That is, embodiments provided herein are not merely limited to measure properties of bonding material, but can be used to directly measure a density of an earth formation that is in contact with the casing. Advantageously, such measurements can provide non-nuclear measurements of earth formation density which has not previously been possible. Those of skill in the art will appreciate that various embodiments of the present disclosure can employ pulse echo measurements, Lamb wave attenuation measurements, and/or shear horizontal ("SH") wave attenuation measurements. Such measurements in conjunction with embodiments described herein allow for direct determination or estimation of both compressional and shear velocities of the material in contact with the casing and, therefore, can allow for calculation of both compressional and shear elastic moduli of that material. Further, additional physical properties can be calculated through use of the processes described herein.

Those of skill in the art will appreciate that embodiments provided herein may build on prior testing systems for determining properties downhole. In prior systems, to measure or determine a property of a bonding material (e.g., cement, epoxy, or another material) coupled to or in contact with the casing within a well bore, the density of the material was assumed (e.g., based on values determined at the surface, determined in a laboratory, based on bonding material product information (e.g., manufacturing specifications), etc.). To determine a shear modulus of a bonding material, prior systems employed a single SH mode and the assumed density of the bonding material (e.g., cement).

Embodiments of the present disclosure employ the use of at least two SH modes of different orders to measure or extract an in situ density and shear velocity of a material that is coupled to an exterior surface of a downhole casing. Thus, assumptions regarding the density of the material may be eliminated and improved accuracy of downhole measurements can be obtained and a more accurate representation of the physical properties can be obtained.

Figure 3A:
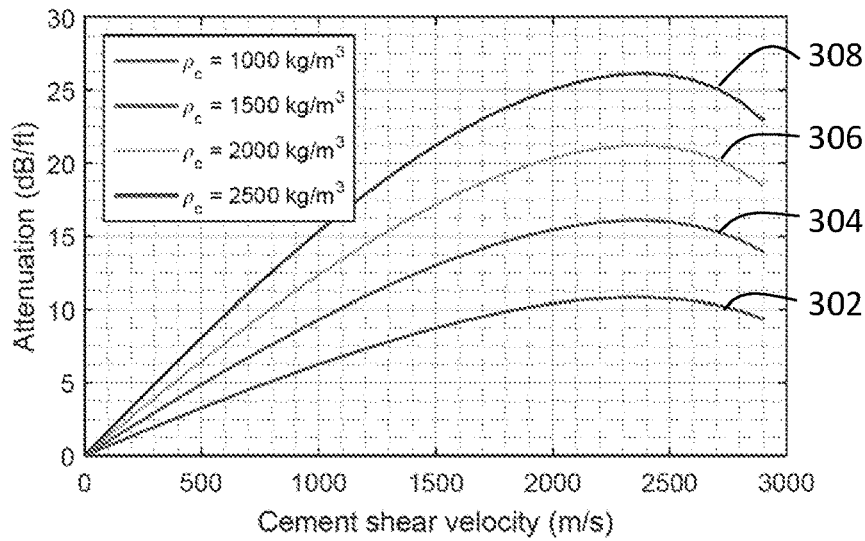
FIG. 3A is a schematic plot of calculated attenuation curves for a first SH mode for an example casing configuration at various densities for varying shear velocities.
Figure 3B:
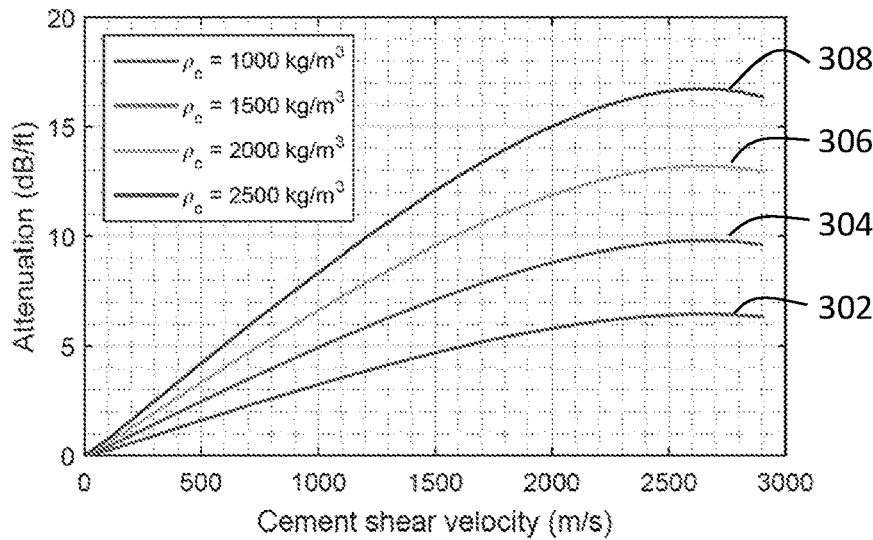
FIG. 3B is a schematic plot of calculated attenuation curves for a second SH mode that is different from the first SH mode for the casing configuration of FIG. 3A.
Figure 3C:
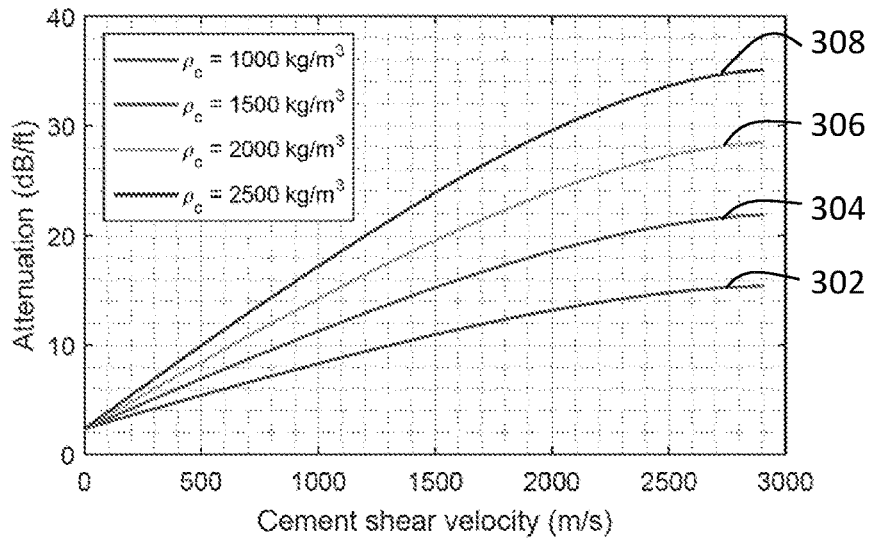
FIG. 3C is a schematic plot of calculated attenuation curves for a third SH mode that is different from the first and second SH modes for the casing configuration of FIG. 3A.

For example, turning to FIGS. 3A-3C, plots of a calculated attenuation curve for circumferential $SH_0$, $SH_1$, and $SH_2$ modes as a function of cement shear velocity and cement density in accordance with a first non-limiting test case are shown. Those of skill in the art will appreciate that although circumferential SH modes are illustrated in the plots of FIGS. 3A-3C, any type of SH mode can be used in accordance with the present disclosure. For example, axial modes, helical modes, and angled modes may be employed. In accordance with the present disclosure, SH modes includes any SH mode of a tubular housing (e.g., a casing), and is not to be limited to any specific type of SH mode.

Calculations used to generate the plots of FIGS. 3A-3C are performed for a thicker casing with outer diameter equal to 10 inches (25.4 cm) and thickness equal to 0.74 inch (1.88 cm). Casing shear velocity and density are 3140 m/s and 8050 kg/m$^3$, respectively. For excitation of particular SH modes, in this example: a center frequency of 179 kHz for $SH_0$; a center frequency of 221 kHz for $SH_1$; and a center frequency of 268 kHz for $SH_2$. Although described herein with respect to cement, those of skill in the art will appreciate that the present discussion can be applied to any bonding material.

As shown in FIGS. 3A-3C, attenuation curves has been generated for cement densities of 1000 kg/m$^3$ (attenuation curve 302), 1500 kg/m³ (attenuation curve 304), 2000 kg/m³ (attenuation curve 306), and 2500 kg/m³ (attenuation curve 308). FIG. 3A is a plot of the calculated attenuation curves 302, 304, 306, 308 for SH mode "$SH_0$" (e.g., fundamental mode). FIG. 3B is a plot of the calculated attenuation curves 302, 304, 306, 308 for SH mode "$SH_1$" (e.g., first order mode). FIG. 3C is a plot of the calculated attenuation curves 302, 304, 306, 308 for SH mode "$SH_2$" (e.g., second order mode). Each of the plots are provided as a function of cement shear velocity and cement density. Those of skill in the art will appreciate that for such a relatively thick casing and SH modes of lower orders, there can be an ambiguity for heavier and stiffer bonding materials (e.g., cement) in the determination of one elastic parameter from one SH mode attenuation assuming that another elastic parameter is known a priori. As provided in accordance with embodiments of the present disclosure, combination of two or more measurements related to two or more SH modes of different orders can overcome this difficulty. As will be appreciated by those of skill in the art, it follows that the value of cement density significantly affects the attenuations of SH modes.

Figure 4:
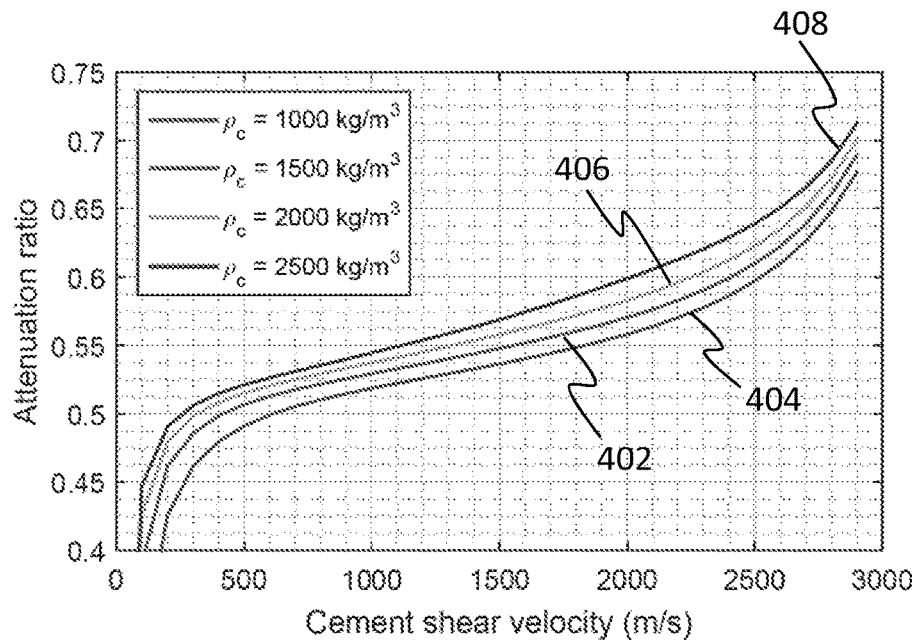
FIG. 4 is a ratio plot of the second SH mode to the first SH mode for each of the cement densities shown in FIGS. 3A-3B.

To investigate the possibility of the inversion of physical properties of cement based on the measurement of the attenuation of two different SH modes, ratios of the attenuations of pairs of SH modes were calculated. For example, as shown in FIG. 4, a ratio plot of $SH_1$ to $SH_0$ for each of the cement densities are shown (1000 kg/m³ (ratio curve 402), 1500 kg/m³ (ratio curve 404), 2000 kg/m³ (ratio curve 406), and 2500 kg/m³ (ratio curve 408)). Additionally, a similar ratio plot of $SH_2$ to $SH_1$ is show in FIG. 5 (1000 kg/m³ (ratio curve 502), 1500 kg/m³ (ratio curve 504), 2000 kg/m³ (ratio curve 506), and 2500 kg/m³ (ratio curve 508)).

Figure 5:
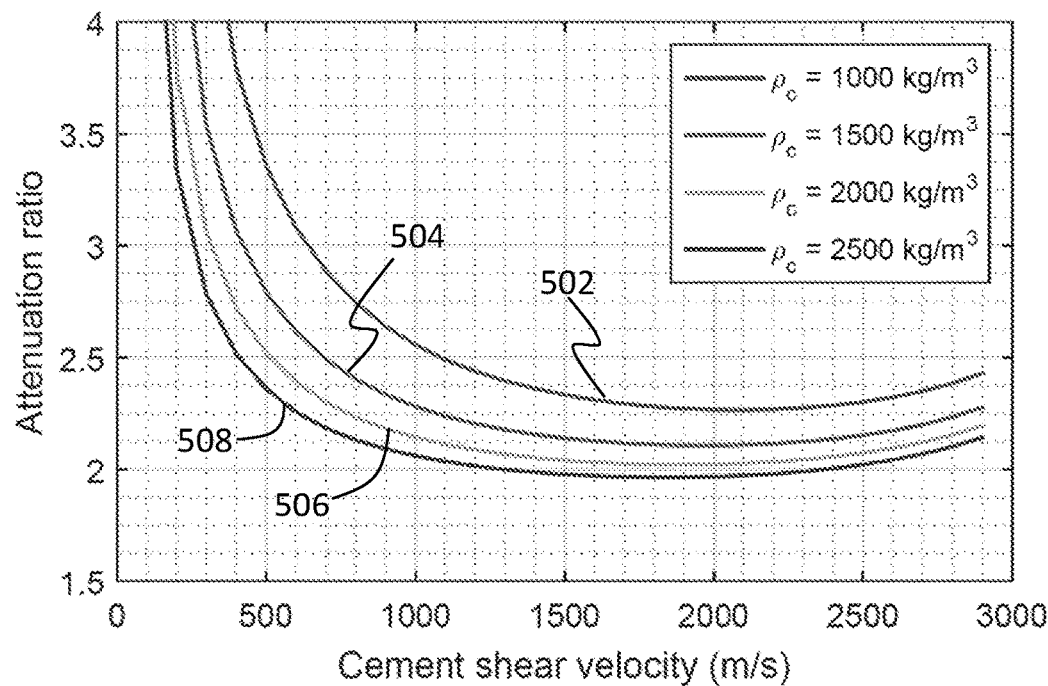
FIG. 5 is a ratio plot of the second SH mode to the third SH mode for each of the cement densities shown in FIGS. 3B-3C.

The ratio plots illustrated in FIGS. 4-5 indicate that different combinations of the density and shear velocities of a bonding material give rise to different attenuations' ratios. This indicates that there is potential for inversion of the data and calculations to obtain or extract out a density and shear velocity value. The larger the spread between curves, the better potential for inversion. It follows from FIGS. 4-5 that the geometry of the casing can significantly influence the corresponding ratios of attenuation of SH modes of different orders (e.g., circumferential SH modes). For the particular casing geometry used for the non-limiting test resulting in the plots of FIGS. 4-5, curves shown in FIG. 4 show smaller sensitivity of the value of $SH_1$-to-$SH_0$ ratio to the cement density than in the cases of $SH_2$-to-$SH_1$ ratio illustrated in FIG. 5.

Figure 6A:
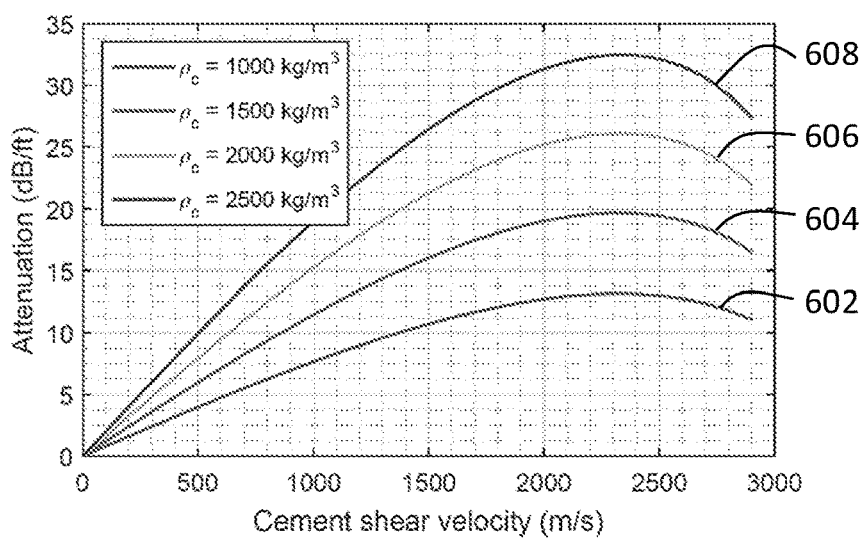
FIG. 6A is a schematic plot of calculated attenuation curves for a first SH mode for another example casing configuration at various densities for varying shear velocities.
Figure 6B:
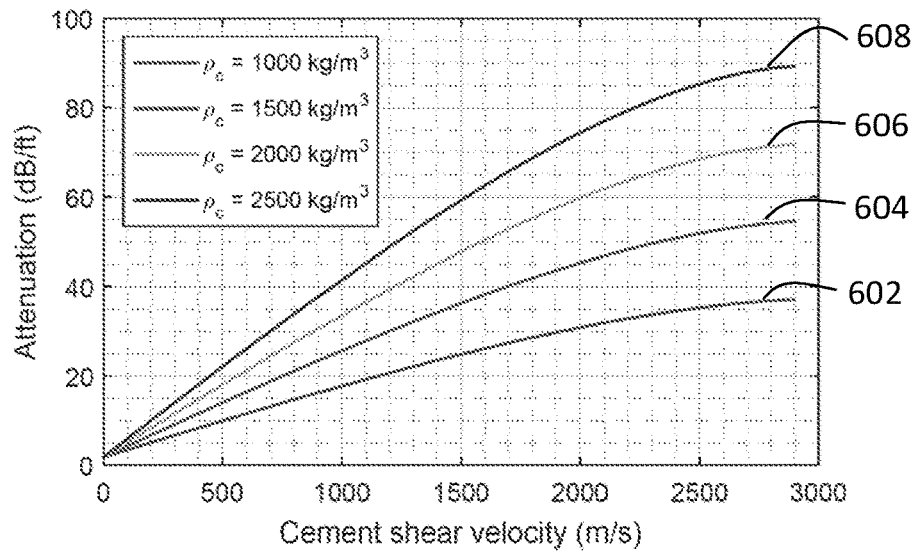
FIG. 6B is a schematic plot of calculated attenuation curves for a second SH mode that is different from the first SH mode for the casing configuration of FIG. 6A.
Figure 6C:
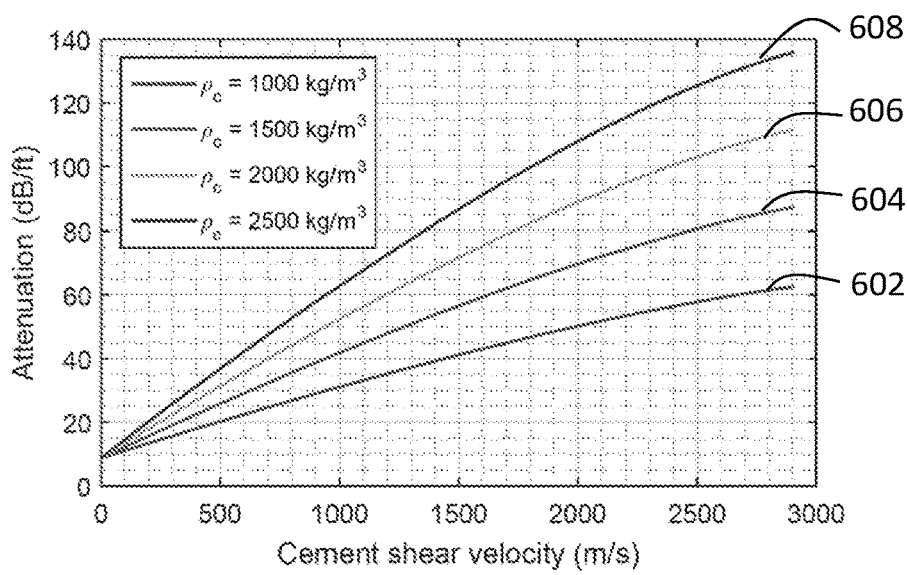
FIG. 6C is a schematic plot of calculated attenuation curves for a third SH mode that is different from the first and second SH modes for the casing configuration of FIG. 6A.

Now, turning to FIGS. 6A-6C, plots of calculated attenuation curves for $SH_0$, $SH_1$, and $SH_2$ modes as a function of cement shear velocity and cement density in accordance with a second non-limiting test case are shown. In the second test case, calculations used to generate the plots of FIGS. 6A-6C are performed for a thinner casing with outer diameter equal to 7 inches (17.8 cm) and thickness equal to 0.317 inch (0.805 cm). For excitation of particular SH modes in the second test case, the following firing signals were employed: a center frequency of 208 kHz for $SH_0$; a center frequency of 289 kHz for $SH_1$; and a center frequency of 469 kHz for $SH_2$.

Similar to the first test case (FIGS. 3A-3C), attenuation curves were generated for cement densities of 1000 kg/m³ (attenuation curve 602), 1500 kg/m³ (attenuation curve 604), 2000 kg/m³ (attenuation curve 606), and 2500 kg/m³ (attenuation curve 608). FIG. 6A is a plot of the calculated attenuation curves 602, 604, 606, 608 for SH mode "$SH_0$" (e.g., fundamental mode). FIG. 6B is a plot of the calculated attenuation curves 602, 604, 606, 608 for SH mode "$SH_1$" (e.g., first order mode). FIG. 6C is a plot of the calculated attenuation curves 602, 604, 606, 608 for SH mode "$SH_2$" (e.g., second order mode). Each of the plots are provided as a function of cement shear velocity and cement density. Again, as will be appreciated by those of skill in the art, it follows that the value of cement density significantly affects the attenuations of SH modes.

Figure 7:
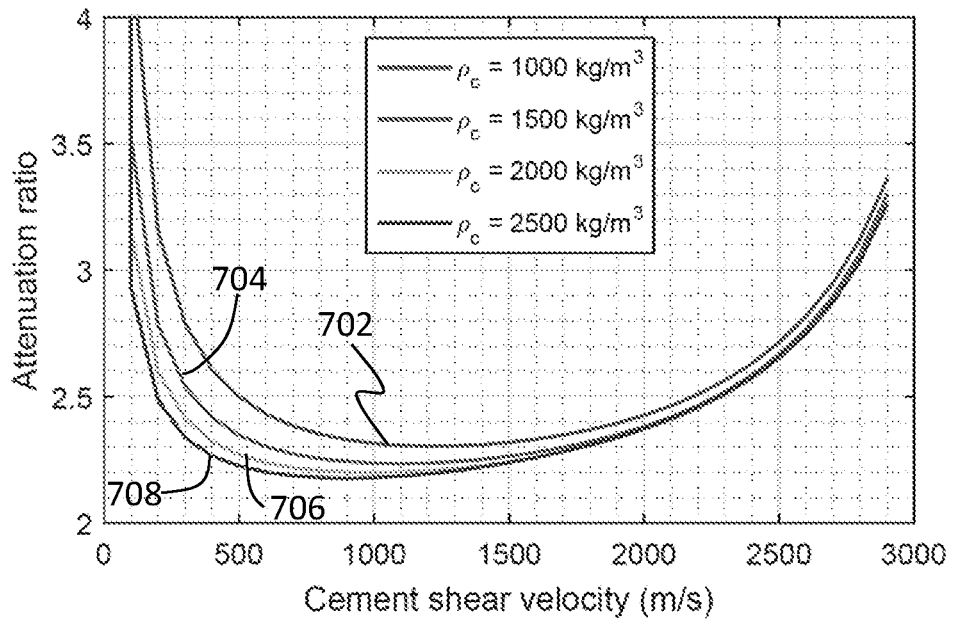
FIG. 7 is a ratio plot of the second SH mode to the first SH mode for each of the cement densities shown in FIGS. 6A-6B.

To investigate the possibility of the inversion of physical properties of cement based on the measurement of the attenuation of two different SH modes, ratios of the attenuations of pairs of SH modes were calculated. For example, as shown in FIG. 7, a ratio plot of $SH_1$ to $SH_0$ for each of the cement densities are shown (1000 kg/m³ (ratio curve 702), 1500 kg/m³ (ratio curve 704), 2000 kg/m³ (ratio curve 706), and 2500 kg/m³ (ratio curve 708)). Additionally, a similar ratio plot of $SH_2$ to $SH_1$ is show in FIG. 8 (1000 kg/m³ (ratio curve 802), 1500 kg/m³ (ratio curve 804), 2000 kg/m³ (ratio curve 806), and 2500 kg/m³ (ratio curve 808)).

Figure 8:
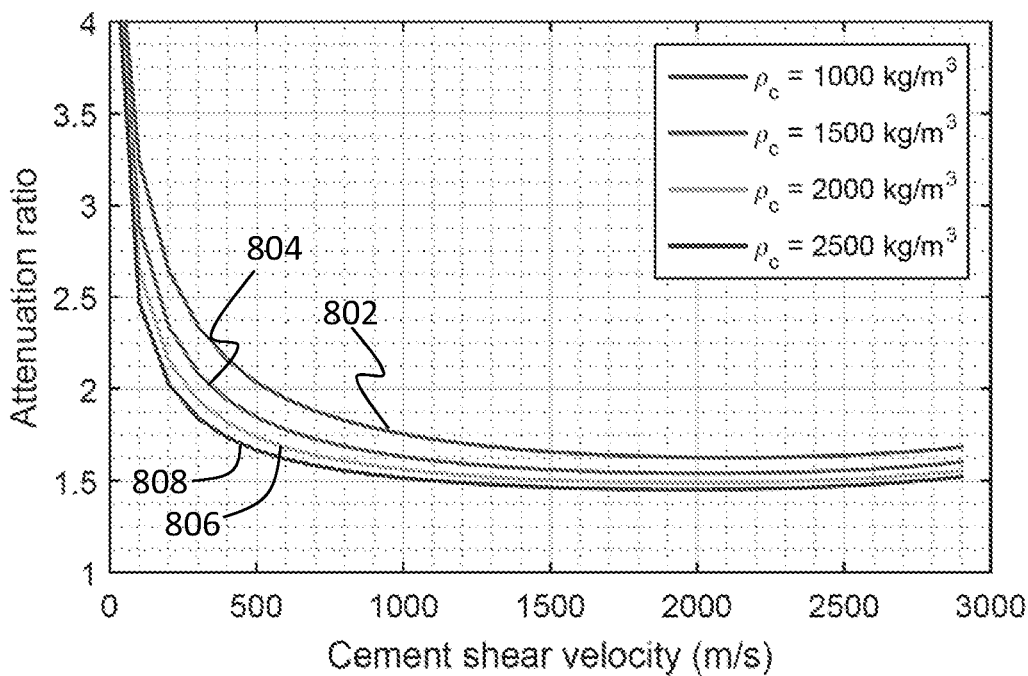
FIG. 8 is a ratio plot of the second SH mode to the third SH mode for each of the cement densities shown in FIGS. 6B-6C.

In the ratio plot of FIG. 7 (e.g., $SH_0$ to $SH_1$), the ratio changes as cement shear velocity changes, however, for stiffer cements the curves tend to coalesce, which can compromise reliable inversion of physical properties of the material based on measurements of the attenuation of SH modes $SH_0$ and $SH_1$. With reference to FIG. 8 (e.g., SH modes $SH_1$-to-$SH_2$), these two modes are more promising in inversion of physical properties for stiffer cements due to the larger spread of ratio curves.

From the above two non-limiting test cases, if a cement density is assumed a priori, one attenuation curve (corresponding to one clean SH mode) is required, provided it is monotonic, to assess shear velocity of the cement. However, if the cement density is not known or not assumed, as well as when the curve is not monotonic, at least two attenuation measurements corresponding to two different SH modes of different orders are required to invert both elastic properties (i.e., density and shear velocity) of the material that is in contact with or coupled to the casing. It is apparent that additional SH modes (e.g., greater than two, as described above) can be utilized without departing from the scope of the present disclosure. Such additional SH modes (e.g., higher order and more than two) can be used to enhance the robustness of the inversion of physical properties of a material. In some embodiments, one of the selected modes is the fundamental SH mode (i.e., $SH_0$ mode). The necessary condition for successful inversion is the excitation of clean SH modes, not perturbed by other SH modes. Further, as noted, additional SH modes can be employed without departing from the scope of the present disclosure. For example, in some embodiments, three different SH modes can be employed. Further, additional SH modes beyond three can be employed, and adding such additional SH modes can be used to increase the robustness of the processes described herein.

Figure 9:
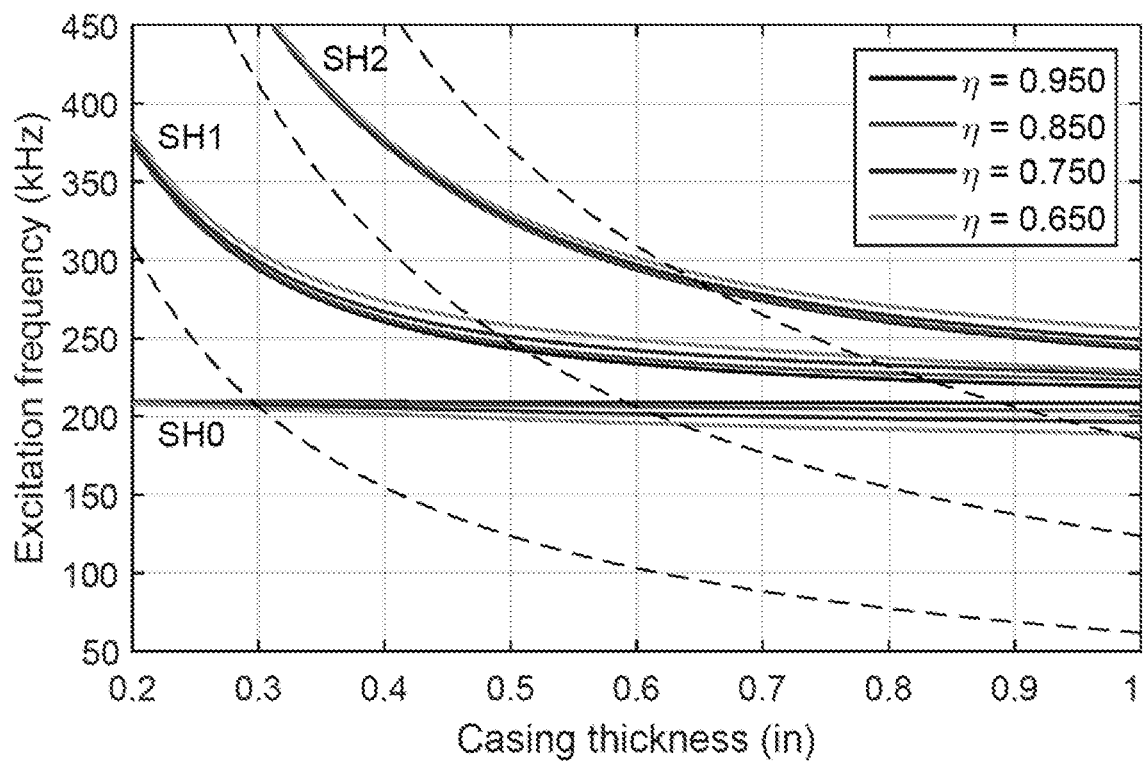
FIG. 9 is a plot of excitation frequencies of SH modes generated by a transducer designed for excitation of guided waves having wavelength equal to 15 mm versus casing thickness for varying casing size ratios (inner diameter to outer diameter)
Figure 10:
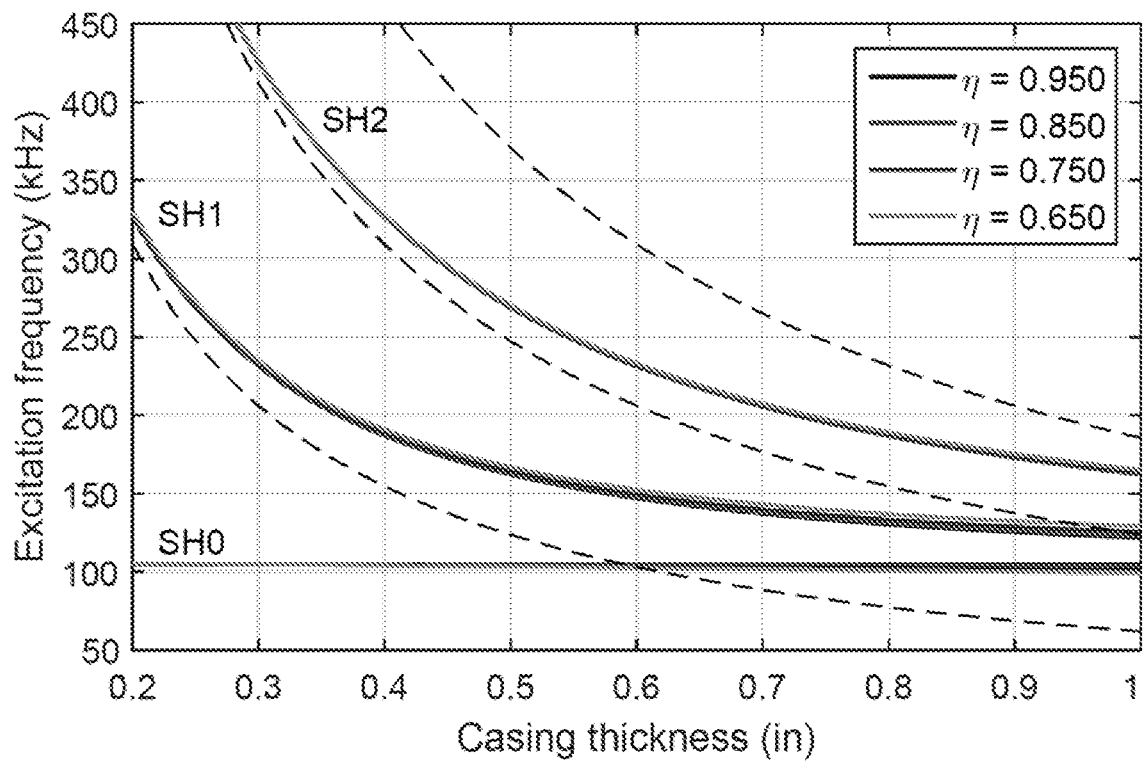
FIG. 10 is a plot of excitation frequencies of SH modes generated by a transducer designed for excitation of guided waves having wavelength equal to 30 mm versus casing thickness.

With the example EMAT transducer design, this can be done for relatively thin casings (e.g., with thickness less than 0.5 inch). For thicker casings EMAT's design can be optimized, which can be achieved in accordance with embodiments of the present disclosure. For example, to enable excitation of clean SH modes for thicker casings, the geometry of the EMAT may be redesigned. FIG. 9 illustrates excitation frequencies of SH modes generated by an EMAT transducer designed for excitation of guided waves with wavelength equal to 15 mm versus casing thickness. The calculations are performed for four casing sizes denoted by a shape factor $\eta$, defined as the ratio of the inner to outer casing diameters. For a given casing thickness, h, the outer diameter can be calculated as $OD = 2*h/(1-\eta)$. Each bundle of curves illustrated in FIG. 9 corresponds to an SH mode of different order (e.g., labeled SH0, SH1, SH2). The dashed black lines in the illustration of FIG. 9 indicate cut-off frequencies of higher-order SH modes as a function of casing thickness. It follows that for thinner casings (e.g., less than 0.5 inch (12.7 mm)), regardless of casing outer diameter, it is possible to excite clean SH modes as the excitation frequencies differ by significant amounts. However, for thicker casings (e.g., greater than 0.5 inch (12.7 mm)), the excitation frequencies of SH modes of different orders coalesce and, therefore, excitation of clean SH modes with this EMAT can be difficult. Changing the geometry of the EMAT allowing the excitation of guided waves with wavelength equal to 30 mm enables generation of cleaner SH modes for thicker casings. For example, FIG. 10 displays corresponding results for a 30 mm wavelength EMAT design. In this case, as will be appreciated by those of skill in the art, all SH modes are excited in significantly lower frequencies and, more importantly, the separation in the frequency between SH modes of different orders is increased (e.g., spacing between SH groups is increased as compared to that shown in FIG. 9). Accordingly, this makes is possible to generate cleaner SH modes for thicker casings.

As will be appreciated by those of skill in the art, inversion of two SH modes can be used to extract physical properties of a material coupled to the casing (e.g., bonding material, formation materials, etc. that are in contact with an external surface of the casing). For example, for a particular casing, the attenuation of two SH modes of different orders can be measured. Then, assuming a density and shear wave velocity of the material bonded to the casing, as well as knowing mechanical properties of the casing, corresponding attenuations can be numerically calculated. If the measured and calculated values do not match, an optimization procedure (e.g. Gauss-Newton method) is applied to iteratively vary the density and shear wave velocity of the material bonded to the casing and amounts to minimize the error between the measured and calculated attenuations.

Further, embodiments provided herein are directed to employing at least two SH modes of different orders to extract shear velocity and density of a material that is in contact with an exterior of a surface of a casing (e.g., coupled to the casing). By knowing the density and shear velocity of the material, other acoustic guided modes such as $A_0$ or $S_0$ can be used to then determine compressional velocity. Knowing the density, shear velocity, and compressional velocity enables other physical properties of a material (e.g., bonding material, formation, etc.) to be determined (e.g., various moduli, Poisson's ratio, Young's Modulus, etc.)

Those of skill in the art will appreciate that embodiments described herein can employ any transducer (e.g., wedge transducers, EMATs, etc.) or any other means to generate SH modes of select or different orders. That is, the present disclosure is not limited to a single type of transducer or transducer configuration.

In one non-limiting example, the fundamental mode $SH_0$ and a higher order mode (e.g., $SH_1$, $SH_2$, etc.) can be employed to perform an inversion to extract the density of the material in contact with an exterior surface of the casing.

Figure 11:
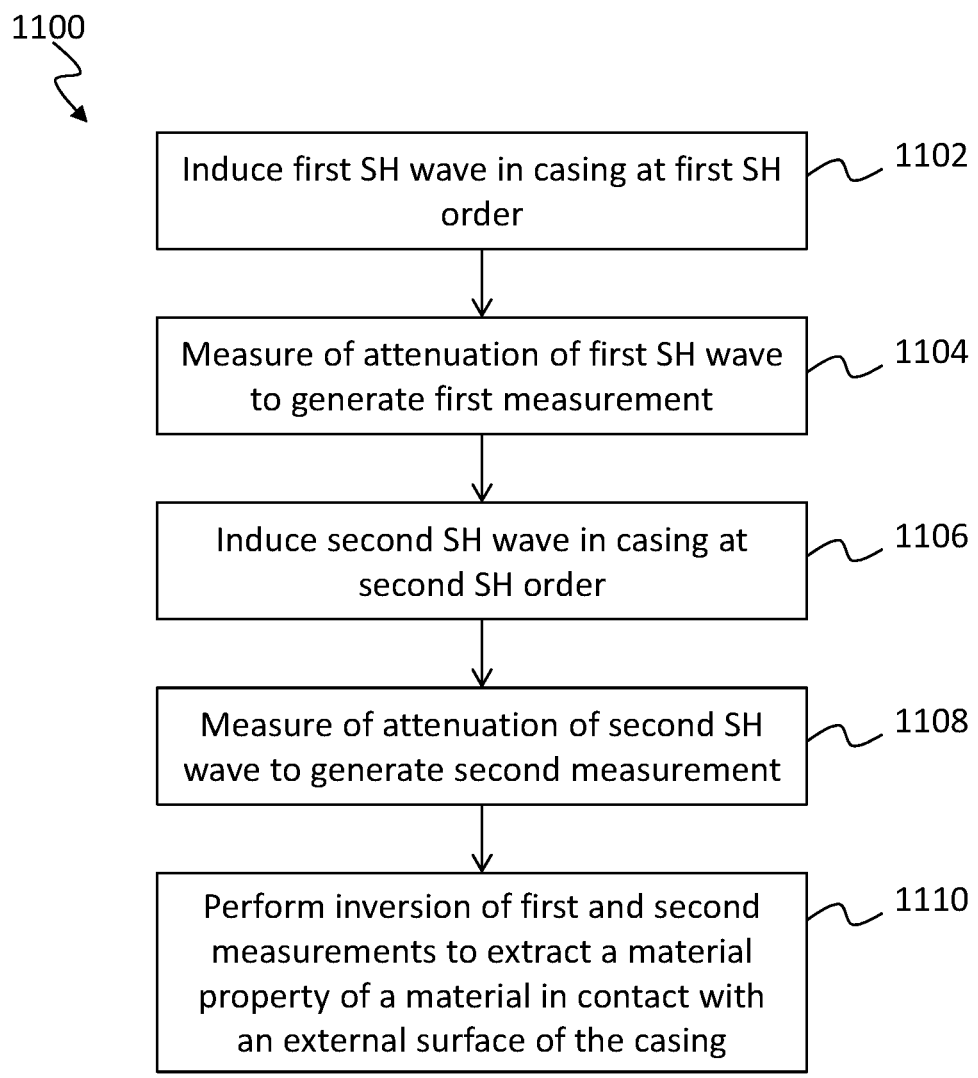
FIG. 11 is a flow process for extracting physical properties of a material in contact with an external surface of a casing in accordance with an embodiment of the present disclosure.

For example, turning now to FIG. 11, a flow process 1100 for performing a density determination in accordance with a non-limiting embodiment of the present disclosure is shown. Flow process 1100 can be performed using downhole tools having one or more transducers and mechanisms to measure and monitor SH waves that are generated and propagate through and along a casing of a downhole tool. In some embodiments, a source can be positioned a first distance from a first sensor and a second distance from a second sensor. In other embodiments, a source can be positioned a distance from a single sensor, and two measurements can be obtained using a single sensor but separated in time. Various other processes for obtaining measurements can be employed without departing from the scope of the present disclosure.

At block 1102, a source is used to generate a first SH wave in and/or along a casing at a first SH order. In some embodiments, the first SH order can be a fundamental order (e.g., $SH_0$). However, in other embodiments, the first SH order can be a higher order SH order, such as a first order SH wave (e.g., $SH_1$), or other higher order, without departing from the scope of the present disclosure.

At block 1104, the first SH wave can be monitored by one or more sensors such that a first measurement is obtained. The first measurement is an attenuation of the first SH wave as it propagates in and/or along the casing. An exterior surface of the casing will be in contact with bonding material that has been pumped downhole and has entered an annulus about the casing, and/or material of a formation can be coupled to or otherwise in contact with an external surface of the casing. Such contact between the materials that are exterior to the casing and the casing itself can impact an attenuation measurement of an SH wave that propagates in and/or along the casing.

At block 1106, the source (or a different source) is used to generate a second SH wave in and/or along the casing at a second SH order. The second SH order is an SH order that is different from the first SH order. For example, in some embodiments, the second SH order can be a higher SH order than the first SH order (e.g., $SH_1$, $SH_2$, etc.).

At block 1108, the second SH wave can be monitored by the one or more sensors such that a second measurement is obtained. The second measurement is an attenuation of the second SH wave as it propagates in and/or along the casing. As noted above, the exterior surface of the casing is in contact with bonding material that has been pumped downhole and has entered the annulus about the casing and/or material of the formation can be coupled to or otherwise in contact with the external surface of the casing. Such contact between the materials that are exterior to the casing and the casing itself can impact an attenuation measurement of an SH wave that propagates in and/or along the casing.

With the first and second measurements of attenuation at different SH orders obtained, an inversion is performed at block 1110 to extract physical properties of the material that is in contact with the exterior surface of the casing. The material may be bonding material, earth formation, or other material located downhole and in contact with the exterior surface of the casing. Further, the physical properties, in some embodiments, are a density and a shear velocity of the material. Accordingly, flow process 1100 can be used to determine a density and shear velocity of a material in situ rather than relying on assumptions or estimations. Further, in some configurations, flow process 1100 enables non-nuclear determination of density of an earth formation.

In some embodiments, one or two measurements may be employed, depending on casing geometry. Various embodiments provided herein are directed to extract two waveforms that represent two SH modes of different order. For example, a single induction of SH waves of differing orders can be generated in a single induction, depending on casing and source configuration. In such configurations, blocks 1102-1108 may be performed simultaneously or nearly simultaneously. In some embodiments, the first and second SH wave inductions can be performed separated by a predetermined period of time.

Further, various embodiments employ two or more transducers (e.g., located at different locations on string/casing). For example, in some embodiments, one transducer can be used with two or more measurements separated in time. Sensor(s) measure the SH waveforms as the waveforms propagate along the casing and a rate of attenuation can be extracted from the waveforms. The rate of attenuation (from the measured waveforms) can be used to indirectly extract properties (e.g., density) of a material that is in contact with an external surface of a casing.

Embodiments provided herein are directed to using at least two SH modes of different orders to extract density information of a material in contact with a casing (in situ). As noted above, and described herein, although two SH modes can be employed, embodiments of the present disclosure include more than two SH modes. In such embodiments, the flow process illustrated in FIG. 11 can include additional steps related to generating and measuring at various SH modes. In some such embodiments, each SH mode may be different from the other employed SH modes. Advantageously, such in situ measurement of density can provide improvements over current techniques that rely on assumed material density. Additionally, advantageously, embodiments provided here enable non-radioactive measurement of formation density (i.e., earth formation in contact with the casing) in situ, which has not previously been achievable with accuracy. Those of skill in the art will appreciate that induction and measurement of the SH modes can be optimized or tailored to specific casing geometries to obtain a clean measurement of the attenuation of each SH mode. Further, those of skill in the art will appreciate that the inversion and calculation can be performed downhole or at the surface, depending on the system configuration.

Embodiment 1: A method for determining physical properties of a material in contact with an external surface of a casing disposed in a borehole, the method comprising: inducing, with a transducer, a first shear horizontal (SH) wave in the casing at a first SH order; measuring, with a sensor disposed on the casing, an attenuation of the first SH wave to generate a first measurement; inducing a second SH wave in the casing at a second SH order that is different from the first SH order; measuring an attenuation of the second SH wave to generate a second measurement; and extracting physical properties of the material in contact with the external surface of the casing from the first and second measurements.

Embodiment 2: The method any of the embodiments described herein, wherein the first SH order is a fundamental SH mode.

Embodiment 3: The method any of the embodiments described herein, wherein the second SH order is one or a first order or a second order SH mode.

Embodiment 4: The method any of the embodiments described herein, wherein the physical properties are a density and a shear velocity of the material in contact with the external surface of the casing.

Embodiment 5: The method any of the embodiments described herein, wherein the material in contact with the external surface of the casing is bonding material pumped from the surface into an annulus between the casing and an earth formation.

Embodiment 6: The method any of the embodiments described herein, further comprising: inducing at least one additional SH wave in the casing at at least one additional SH order that is different from the first and second SH orders; and measuring an attenuation of the at least one additional SH wave to generate at least one additional measurement.

Embodiment 7: The method any of the embodiments described herein, wherein the material in contact with the external surface of the casing is a downhole earth formation.

Embodiment 8: The method any of the embodiments described herein, further comprising optimizing the first and second inductions and the first and second measurements based on characteristics of the casing.

Embodiment 9: The method any of the embodiments described herein, wherein the first and second inductions occur simultaneously.

Embodiment 10: The method any of the embodiments described herein, wherein the extraction of the physical properties is performed downhole.

Embodiment 11: A system for determining physical properties of a material in contact with an external surface of a casing disposed in a borehole, the system comprising: a casing configured to be conveyed through a borehole; at least one transducer and at least one sensor configured with the casing; and a processor configured to communicate with the at least one transducer and the at least one sensor, the system configured to: induce, with the at least one transducer, a first shear horizontal (SH) wave in the casing at a first SH order; measure, with the at least one sensor, an attenuation of the first SH wave to generate a first measurement; induce a second SH wave in the casing at a second SH order that is different from the first SH order; measure an attenuation of the second SH wave to generate a second measurement; and extract physical properties of the material in contact with the external surface of the casing from the first and second measurements.

Embodiment 12: The system any of the embodiments described herein, wherein the first SH order is a fundamental SH mode.

Embodiment 13: The system any of the embodiments described herein, wherein the second SH order is one or a first order or a second order SH mode.

Embodiment 14: The system any of the embodiments described herein, wherein the physical properties are a density and a shear velocity of the material in contact with the external surface of the casing.

Embodiment 15: The system any of the embodiments described herein, wherein the material in contact with the external surface of the casing is bonding material pumped from the surface into an annulus between the casing and an earth formation.

Embodiment 16: The system any of the embodiments described herein, the system further configured to: induce at least one additional SH wave in the casing at at least one additional SH order that is different from the first and second SH orders; and measure an attenuation of the at least one additional SH wave to generate at least one additional measurement.

Embodiment 17: The system any of the embodiments described herein, wherein the material in contact with the external surface of the casing is a downhole earth formation.

Embodiment 18: The system any of the embodiments described herein, the system further configured to optimize the first and second inductions and the first and second measurements based on characteristics of the casing.

Embodiment 19: The system any of the embodiments described herein, wherein the first and second inductions occur simultaneously.

Embodiment 20: The system any of the embodiments described herein, wherein the extraction of the physical properties is performed downhole.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for determining physical properties of a material in contact with an external surface of a casing disposed in a borehole, the method comprising:
   inducing, with a transducer, a first shear horizontal (SH) wave in the casing at a first SH order;
   measuring, with a sensor disposed on the casing, an attenuation of the first SH wave to generate a first measurement;
   inducing a second SH wave in the casing at a second SH order that is different from the first SH order;
   measuring an attenuation of the second SH wave to generate a second measurement; and
   extracting physical properties of the material in contact with the external surface of the casing from the first and second measurements.

2. The method of claim 1, wherein the first SH order is a fundamental SH mode.

3. The method of claim 1, wherein the second SH order is one or a first order or a second order SH mode.

4. The method of claim 1, wherein the physical properties are a density and a shear velocity of the material in contact with the external surface of the casing.

5. The method of claim 1, wherein the material in contact with the external surface of the casing is bonding material pumped from the surface into an annulus between the casing and an earth formation.

6. The method of claim 5, further comprising:
inducing at least one additional SH wave in the casing at at least one additional SH order that is different from the first and second SH orders; and
measuring an attenuation of the at least one additional SH wave to generate at least one additional measurement.

7. The method of claim 1, wherein the material in contact with the external surface of the casing is a downhole earth formation.

8. The method of claim 1, wherein the first and second inductions occur simultaneously.

9. The method of claim 1, wherein the extraction of the physical properties is performed downhole.

10. The method of claim 1, wherein the extraction of physical properties of the material in contact with the external surface of the casing based on the first and second measurements is performed in situ.

11. A system for determining physical properties of a material in contact with an external surface of a casing disposed in a borehole, the system comprising:
a casing configured to be conveyed through a borehole;
at least one transducer and at least one sensor configured with the casing; and
a processor configured to communicate with the at least one transducer and the at least one sensor, the system configured to:
induce, with the at least one transducer, a first shear horizontal (SH) wave in the casing at a first SH order;
measure, with the at least one sensor, an attenuation of the first SH wave to generate a first measurement;
induce a second SH wave in the casing at a second SH order that is different from the first SH order;
measure an attenuation of the second SH wave to generate a second measurement; and
extract physical properties of the material in contact with the external surface of the casing from the first and second measurements.

12. The system of claim 11, wherein the first SH order is a fundamental SH mode.

13. The system of claim 11, wherein the second SH order is one or a first order or a second order SH mode.

14. The system of claim 11, wherein the physical properties are a density and a shear velocity of the material in contact with the external surface of the casing.

15. The system of claim 11, wherein the material in contact with the external surface of the casing is bonding material pumped from the surface into an annulus between the casing and an earth formation.

16. The system of claim 15, the system further configured to:
induce at least one additional SH wave in the casing at at least one additional SH order that is different from the first and second SH orders; and
measure an attenuation of the at least one additional SH wave to generate at least one additional measurement.

17. The system of claim 11, wherein the material in contact with the external surface of the casing is a downhole earth formation.

18. The system of claim 11, wherein the first and second inductions occur simultaneously.

19. The system of claim 11, wherein the extraction of the physical properties is performed downhole.

20. The system of claim 11, wherein the extraction of physical properties of the material in contact with the external surface of the casing based on the first and second measurements is performed in situ.

* * * * *